United States Patent [19]

Bright et al.

[11] Patent Number: 4,754,457
[45] Date of Patent: Jun. 28, 1988

[54] DIGITAL SEQUENCE POLARITY DETECTION WITH ADAPTIVE SYNCHRONIZATION

[75] Inventors: Michael W. Bright, Arlington Heights; Alan L. Wilson, Hoffman Estates, both of Ill.

[73] Assignee: Motorola, Inc., Schaumburg, Ill.

[21] Appl. No.: 903,326

[22] Filed: Sep. 3, 1986

[51] Int. Cl.$^4$ .............................................. H04L 7/06
[52] U.S. Cl. ...................................... 371/47; 375/116; 364/728
[58] Field of Search .................... 371/47, 42; 375/116, 375/96, 106, 111, 114, 118, 94; 370/100, 105, 106; 364/728, 200, 900

[56] References Cited

U.S. PATENT DOCUMENTS

| | | | |
|---|---|---|---|
| 4,575,864 | 3/1986 | Rice | 364/728 |
| 4,611,326 | 9/1986 | McNamara | 371/47 |
| 4,653,048 | 3/1987 | Anderson | 371/47 |
| 4,654,480 | 3/1987 | Weiss | 371/47 |
| 4,667,318 | 5/1987 | Sugiyama | 371/47 |
| 4,670,890 | 6/1987 | Titchener | 371/47 |
| 4,680,766 | 7/1987 | Wilkinson | 371/47 |

Primary Examiner—Michael R. Fleming
Attorney, Agent, or Firm—Steven G. Parmelee

[57] ABSTRACT

The transmitter in a digital communication system sends a synchronization sequence that uniquely identifies the polarity of the received data. From the received data, the receiver produces non-inverted and inverted polarity data streams that couple to like synchronization detectors. Only the detector to which the correct polarity data stream is coupled responds. Logic circuitry determines which detector responds and, accordingly, selects the polarity of received data to be further processed by the receiver.

After polarity is established, both detectors monitor the received data stream of the selected polarity to determine whether synchronization shifts after having been initially established. Monitoring continues until terminated by other receiver circuits.

8 Claims, 4 Drawing Sheets

DIGITAL SEQUENCE POLARITY DETECTION WITH ADAPTIVE SYNCHRONIZATION

TECHNICAL FIELD

This invention relates in general to synchronous digital communication systems and in particular to determining the polarity of and synchronizing to received digital data.

BACKGROUND ART

Some of the decisions in the design of synchronous digital communication systems involve the method of encoding source bits and the method of synchronizing decoding processes in the receiver for correct recovery of the transmitted message.

In a binary data system, each bit received from the channel can be one of two possible symbols. Without a priori knowledge of polarity inversions that the bits may have encountered in crossing the channel, the receiver lacks the information necessary to decode the individual bits. Inversions may occur when the data is modulated by frequency shift keying (FSK) and the signal undergoes frequency translations in being sent across the channel. In FSK modulation, a positive frequency shift of the carrier corresponds to one binary symbol, and a negative shift corresponds to the other. Frequency translations during up- or down-conversions associated with radio transmission or with multiplexing for telephone line transmission may not preserve the meanings of positive and negative frequency modulation shifts.

One of the methods used in the prior art to preserve polarity information across a channel is known as differential encoding. The signal is encoded so that information resides in the difference of polarity from one bit to the next. Using this method avoids the need for a coherent, local phase reference, since each bit serves as the local reference for the succeeding bit. Differential encoding trades noise performance for reduced system complexity. An error in one bit extends to the next, for if an error occurs in one bit, the receiver has an uncertain reference and may not correctly decode the next bit. By degrading error performance, differential encoding may interfere with system operation. In particular, it may diminish the effectiveness of error correction circuits.

The present invention also addresses the method of synchronization used in a communication system. What method is used can affect the ability of the receiver to detect sequences transmitted over the channel for various identification purposes, to maintain or quickly regain synchronization in an noisy channel environment, and to quickly adapt to changes in delay characteristics of the transmission channel. Prior art design choices have frequently involved tradeoffs, in which improvements of one aspect of synchronization performance have meant degradation of another.

An example of transmitting sequences for identification occurs in a synchronous stream encryption system. The transmitter encrypts source bits with a pseudo-random keystream sequence; the receiver decrypts them by an inverse operation. Each channel bit produced depends only on its position in the stream of source bits and on the particular keystream in use. To recover the source bits, the receiver must regenerate the keystream locally and align it with incoming channel bits.

To enable the receiver to regenerate and align the keystream, the transmitter sends an identifying sequence. Not knowing when the sequence will be sent, the receiver must be able to detect the sequence in the presence of random digital data. Detecting a sequence can serve a variety of other purposes. For example, to increase the certainty that the receiver has correctly identified a synchronization or timing mark imbedded within noisy data, the system may require that the receiver have previously detected a unique sequence.

A different aspect of synchronization that the present invention addresses is how the receiver initially establishes synchronization when communication begins and how it maintains synchronization during interruptions of communication. When error correction is used to improve the certainty of synchronization in a noisy environment, initial synchronization is often a slow process. Error correction circuits must process a number of bits to reach full effectiveness. Synchronization attempts made shortly after transmission begins or after recovery from a fade use less certain bits and may, therefore, be less reliable than later attempts, which can use more certain bits.

Delaying synchronization also helps the receiver adapt to changes in delay characteristics of the transmission channel that occur after communication has been established. One type of delay change contemplated by the invention is found in a multiple site system with receivers situated at diverse geographic sites to obtain wide area coverage of the transmitted signal. Each of the receivers sends demodulated output to a central control point that chooses one signal path, according to signal quality, to supply the data decoding circuits. The time scales may be misaligned among the data signals received from the several sites because of propagation differences in the paths from the transmitter to each of the receiving sites or differences in the electrical paths from the remote sites to the control point. Synchronization may be disrupted if the path selection changes after a message commences.

In a typical scenario, the receiver selection occurs shortly after a message begins. The initial selection may be changed before being made final. Synchronization rapidly acquired at the start of the message might later become incorrect if the selection changes. Under these circumstances, it is desirable for the synchronization system to be able to rapidly and automatically readjust.

Delaying synchronization affects the ability of the receiver to quickly recover from momentary communication impairments, so prior art designs have often employed hysteresis to provide adaptive timing. Hysteresis prevents the receiver from attempting to reestablish synchronization, with its attendant delay, if it has been interrupted for only a short time. An example of hysteresis may be found in a communication system designed for a terrestrial radio channel that may be subject to momentary fading. During a fade, the receiver may be unable to continue to recover synchronization information yet have sufficient short-term stability to continue to correctly decode channel bits. Without hysteresis, the receiver would attempt to reestablish synchronization each time it recovered from a fade.

A problem experienced with hysteresis is that it prevents the receiver from responding to synchronization changes until the hysteresis interval has elapsed. This interferes with the ability to respond rapidly, as required in a multiple site receiver system.

SUMMARY OF THE INVENTION

It is an object of this invention to overcome the foregoing deficiencies in prior art digital communication systems in determining polarity of digital channels and in reliably establishing and maintaining synchronization.

In particular, it is an object of this invention to provide an improved method for determining the polarity of a received digital data stream without adversely affecting the performance of error correction circuits.

It is a further object of this invention to provide an improved method for detection of synchronization sequences by being able to quickly readjust after initial synchronization and tolerate path delay shifts that occur soon after transmission begins.

It is another object of this invention to provide a synchronization method that can rapidly reacquire synchronization after it has been interrupted momentarily because of transmission impairments.

According to the invention, the transmitter in a digital communication system sends a synchronization sequence that uniquely identifies the polarity of the data. From the received data, the receiver produces non-inverted and inverted polarity data streams that couple to like synchronization detectors. Only the detector to which the correct polarity data stream is coupled responds. Logic circuitry determines which detector responds and, accordingly, selects the polarity of received data to be further processed by the receiver.

After polarity is established, both detectors monitor the received data stream of the selected polarity to determine whether synchronization shifts after having been initially established. Monitoring continues until terminated by other receiver circuits.

BRIEF DESCRIPTION OF THE DRAWINGS

The features of the present invention that are believed to be novel are set forth with particularity in the appended claims. The invention, together with further objects and advantages thereof, may be understood by reference to the following detailed description taken in conjunction with the accompanying drawings, in which:

DETAILED DESCRIPTION OF THE INVENTION

The invention is shown as part of a synchronous digital communication system, which includes: a transmitter, a communication channel, and a receiver. The transmitter sends a sequence for purposes of identifying channel polarity and providing synchronization information. The sequence will not be detected if it is inverted. The receiver creates non-inverted and inverted data streams from the received signal and couples them to two like sequence detection circuits that can respond to the transmitted sequence. Regardless of the net polarity through the channel from transmitter to receiver, one of the two data streams will have net non-inverted polarity, and the sequence detector to which it is coupled will be able to respond to the sequence. Logic circuitry determines which has responded and selects that polarity of data for further processing in the receiver.

The method used for sequence detection is to locally generate a sequence that is based on a portion of the received data stream and that is continued according to the algorithm by which the transmitter generates its identifying sequence. Error correction circuitry estimates errors that may have corrupted the sequence during transmission and corrects them to the extent possible. The detector correlates the data stream and local sequence during an interval that is shifted either ahead or behind the portion of the error-corrected data stream used to initialize the local sequence generator, thereby avoiding the region during which short-term correlation between the data stream and local sequence would otherwise cause false indications of detection when only noise or random data is being received. Although not shown here, the logic circuitry may provide switching so that the detector that has responded can provide its locally generated sequence to receiver circuits for further processing.

After one detector responds, which establishes polarity, the logic couples both detectors to the input stream of the selected polarity. The logic circuit monitors both detectors, and if the other detector responds, the logic circuit selects it, instead of the first detector to have responded, for providing the locally regenerated sequence to the receiver circuits. Also, after a detector has responded, hysteresis in the logic prevents that detector from immediately changing its locally regenerated sequence but allows the other detector to quickly respond to synchronization changes.

Figure 1:
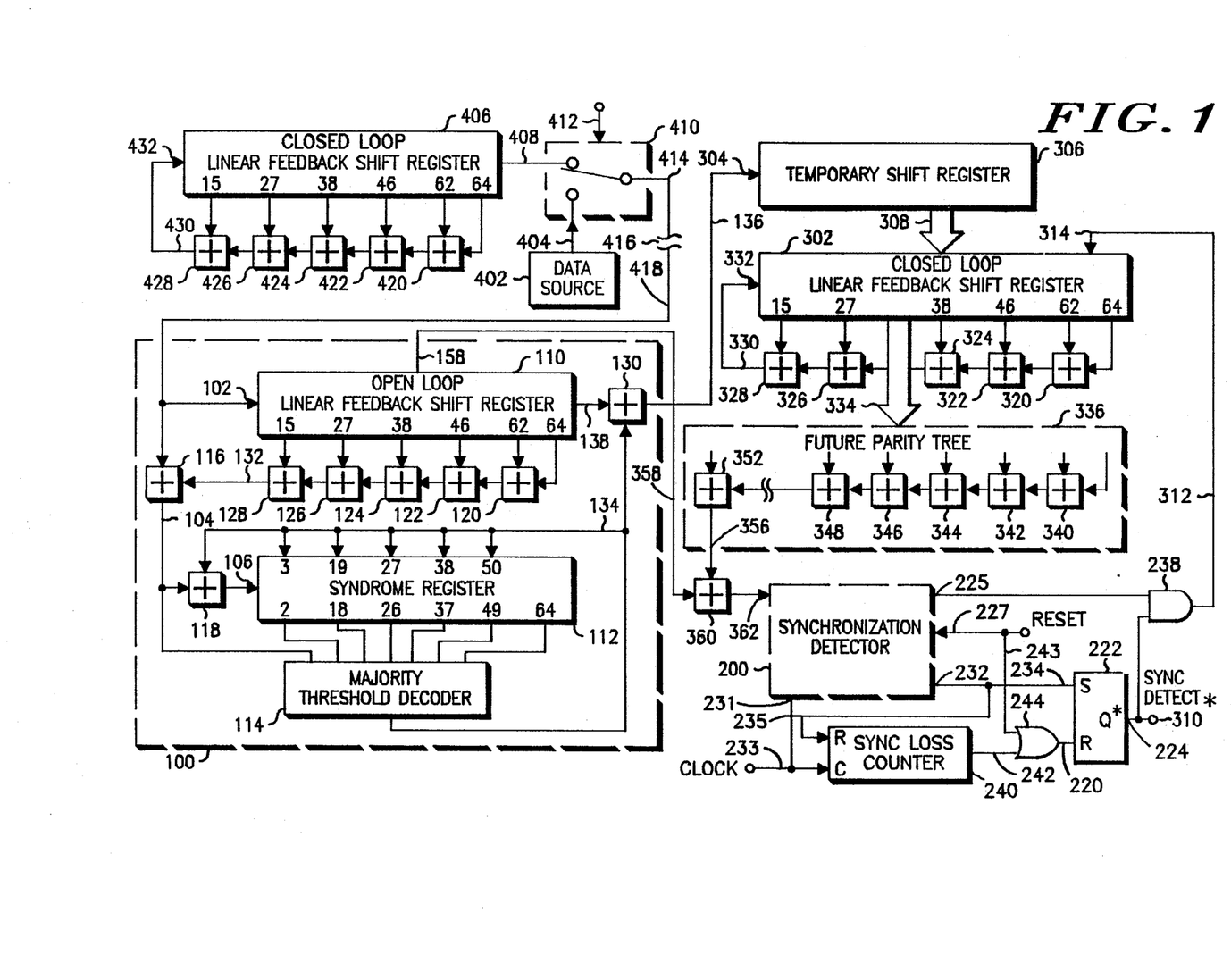
FIG. 1 is a block diagram of a synchronization sequence detector that includes error correction and is of the type used in the embodiment of the invention.

The operation of the sequence detectors is readily explained with reference to FIG. 1, which isolates one detector. The detection circuit of FIG. 1 is the subject of U.S. Pat. No. 4,667,327, entitled "Linear Feedback Sequence Detection with Error Correction," which issued May 19, 1987, to Bright et al., and is assigned to the assignee of this application.

FIG. 1 shows a transmitter, which includes a source 402 of arbitrary serial data 404, a generator 406 for developing a synchronization sequence 408, and a switch 410 that selects, on command of control line 412, either the source data or the synchronization sequence for output at 414 onto a communication channel 416. The sequence generator is a linear feedback shift register (LFSR) that generates a pseudo-random, maximal length sequence according to characteristic polynomial, C(x), where:

$$C(x) = 1 + x^{15} + x^{27} + x^{38} + x^{46} + x^{62} + x^{64}.$$

Outputs from shift register stages corresponding to non-zero terms in the polynomial add in exclusive-OR gates 420, 422, 424, 426, and 428 to form parity signal 430, which feeds back to the first stage of the register at 432. Those skilled in the art will appreciate that the length of the shift register and the characteristic polynomial are matters of design choice depending on the particular application required.

The output of the transmitter reaches the receiver at 418 via communication channel 416. The receiver uses circuit 100 to estimate and, within limits, correct errors in a shift register synchronization sequence. No provision is made here to correct errors in random serial data. A suitable embodiment for circuit 100 is fully described in U.S. Pat. No. 4,667,327, entitled "Error Corrector for a Linear Feedback Shift Register Sequence," issued May 19, 1987, to Bright et al., which is assigned to the same assignee as the present application and is incorporated by reference as if set forth fully herein. The circuit will be only briefly described here.

The received bits shift into register 110 at input 102. Exclusive-OR gates 120, 122, 124, 126, and 128, arranged according to the characteristic polynomial used in the transmitter, combine outputs of the register to form a parity bit at 132. The parity bit does not feed back into the register 110; instead, it drives one side of exclusive-OR gate 116, which compares the parity bits with the received bits. When the expected LFSR sequence is received, each parity bit and corresponding incoming bit should agree; a difference indicates either that the received bit is not from the expected sequence or that the bit is from the sequence but has been corrupted by noise.

A difference causes exclusive-OR gate 116 to indicate a logical true level. Successive bits from gate 116 shift through gate 118 into syndrome register 112. Selected outputs of the syndrome register represent past estimated errors and feed majority threshold decoder gate 114. The majority gate also receives the most recent estimated error from signal 104, which improves the ability of the circuit to correct errors under high error rate conditions. The decode threshold is 1 greater than a majority to account for this additional input.

When sufficient estimates of error in the syndrome register 112 coincide with the taps feeding the majority gate 114, its output 134 asserts, indicating that an error has been estimated in the bit at 138 that is at this time being shifted out of register 110. Signal 134 corrects the bit by complementing it in exclusive-OR gate 130, making corrected bits available at 136. Additionally, signal 134 complements the error terms as they shift into succeeding stages in the syndrome register 112 and complements signal 104 as it passes through gate 118 to feed into the syndrome register at 106. This is known as syndrome resetting, which has the effect of removing error terms greater that the length of the shift register and which further improves the error correction capability of the circuit.

As the corrected bit stream becomes available at 136, the receiver searches for the LFSR sequence by performing several steps. First, it loads a portion of the corrected bit stream into shift register 302. Next, it locally regenerates an LFSR sequence continuing from that initial load, using a parity tree to provide feedback at 332 according to the characteristic polynomial in the transmitter. At the same time, it derives a sequence shifted from that in register 302, using future bit parity tree 336 to provide the shifted sequence at 356. Finally, it correlates the shifted sequence at 356 with a correspondingly shifted input sequence at 358, using detector 200 and sync detect latch 222 to indicate by signal syncdetect* at 310 whether the received signal is the expected LFSR sequence.

If the initial load in closed-loop register 302 were incorrect to generate the LFSR sequence, detector 200 would fail to indicate detection. In that event, register 302 would have to be reloaded for a new attempt to generate the sequence. The preferred embodiment uses a parallel loading arrangement that saves time and can give more chances to reload when only a limited number of bits of the LFSR sequence are transmitted. To shift out the incorrect bits from register 302 and refill it in serial would require shifting in 64 new bits. However, by loading in parallel, new bits replace incorrect bits in a single operation and save the time otherwise needed for 64 shifts.

The length of the correlation interval is 48 bits. After correlation, 48 bits will have shifted into register 302 from the feedback parity tree at 332 and must be replaced. Sixteen of the initial 64 bits will have been shifted by 48 places, but they will remain in register 302 and may be kept. During the correlation interval, temporary shift register 306 receives 48 error-corrected bits in serial at 304 and stores them. Then, on command from line 314, the parallel load operation sends 48 new bits on bus 308 from register 306 to replace the 48 feedback bits in register 302, leaving the other 16 bits in place.

To form the parity bit 330 that feeds back at 332 to regenerate the LFSR sequence, exclusive-OR gates 320, 322, 324, 326, and 328 add outputs of register 302 selected according to the characteristic polynomial used in the transmitter. Each parity bit computed is the next bit in sequence following the 64 bit vector initially loaded in shift register 302.

Future parity tree 336 provides at 356 a sequence of bits shifted ahead of the sequence of parity bits feeding back at 332 to register 302. The polynomial, P(x), to compute the parity sequence shifted by (i) bits may be determined from the characteristic polynomial for the sequence, C(x), as:

$$P(x) = x^{-(i+1)} \bmod C(x),$$

where positive values of index (i) mean a shift to the future, and negative values mean a shift to the past. In other words, P(x) is the remainder after dividing $x^{-(i+1)}$ by the characteristic polynomial C(x). For a shift of 25 bits to the future, i = +25, and:

$$P(x) = x^1 + x^4 + x^{12} + x^{16} + x^{20} + x^{27} + x^{35} + x^{36} + x^{38} + x^{51} + x^{53}.$$

The polynomial terms indicate how to combine taps on the intermediate stages of shift register 302. A zero degree term would correspond to the output of the first stage of the register, a first degree term would refer to the output of the second stage, and so on until a 63rd degree term, which would indicate the output of the 64th, or last, stage of the register. A zero coefficient would indicate to ignore that output; a non-zero coefficient would indicate to include that particular intermediate output in the parity sum. For example, to compute the sequence shifted 25 bits into the future requires ten exclusive-OR gates to sum the eleven non-zero terms in the polynomial P(x). Exclusive-OR gates 340, 342, 344, 346, and 348 through 352 represent the parity tree.

A version of the input sequence shifted by an amount corresponding to the future parity sequence is obtained by taking a tap ahead of the output stage of register 110. The feedback parity sequence 330 corresponds in time to the bit sequence coming out of the open loop register 110 at 138 and available with error correction at 136. Register 110 delays the input sequence by 64 bits, so a sequence shifted ahead by the equivalent shift in the future parity tree, up to 64 bits, is available at one of the intermediate stages in the register. To obtain a shift of 25 bits, line 158 takes the input sequence from tap 39 of the register, 25 bits ahead of the output at the 64th stage.

Finally, the two sequences are correlated during a suitable measuring interval. Exclusive-OR gate 360 compares corresponding bits from the two sequences coupled to it on lines 356 and 358 and indicates errors by logical true on output 362 whenever they differ. Detector 200 accumulates the comparisons for a predetermined number of bits and indicates detection if the number of disagreements is less than a selected limit.

Figure 2:
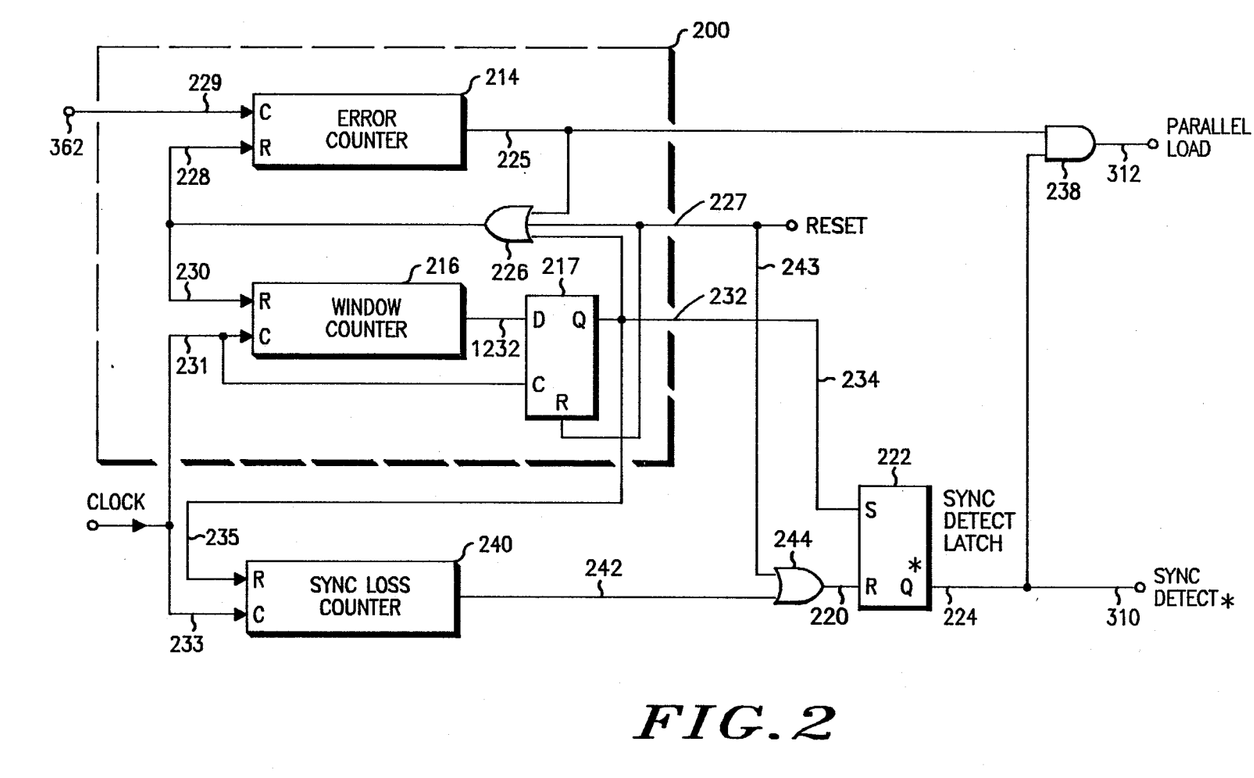
FIG. 2 is a block diagram showing in greater detail the sequence correlation circuits of FIG. 1.

FIG. 2 shows details of synchronization detector 200, sync loss counter 240, and miscellaneous logic circuitry for internal resetting and for providing output signals 310 and 312. In response to a clock synchronized with the sequences and supplied at pin 231, window counter 216 counts towards a terminal count, which defines the correlation interval and is chosen here as 48, while the error counter 214 accumulates error indications supplied by line 362 to its clock pin 229. Delay flip-flop 217, coupled to the terminal count output 1232 of the window counter, delays and holds that output on line 232 for one clock period. Whichever counter reaches terminal count first resets both by sending its terminal count output through OR gate 226, whose output resets the error counter at 228 and the window counter at 230. When the error counter reaches terminal count, line 225 pulses only momentarily, as the reset clears the terminal count. When the window counter resets, the pulse at 232 holds for an entire clock period, which facilitates the timing of circuits coupled to it.

To initialize and start the detector from a known state, an externally supplied reset signal momentarily goes high and couples on line 243 through OR gate 244 to reset sync detect latch 222, which forces a logical true on the Q* output 224. The reset signal also clears the delay flip-flop 217 and resets the error and window counters through OR gate 226. Now, if sufficient error counts arrive on line 362 for the error counter to reach its terminal count before the window counter resets it, the error counter momentarily asserts line 225, which, combining in AND gate 238 with the logical true on line 224, sends a parallel load pulse on line 312 to shift register 302 at pin 314, shown in FIG. 1. Upon receiving the parallel load signal, register 302 reloads from the contents of temporary register 306 and begins generating a sequence from the new load vector.

In contrast, if few error indications arrive on line 362, the window counter will reach its terminal count before the error counter does and will assert line 1232. A high will appear on 232 one bit time later, which sets latch 222 at pin 234, and output 224 negates, which inhibits gate 238 from sending a parallel load signal to the shift register. The sequence generator continues to generate the sequence according to its initial load vector. Sync-detect* 310 negates, indicating that the LFSR sequence has been detected.

Sync loss counter 240 provides detection hysteresis, which allows sync detector 200 to accept momentary bursts of errors in the received sequence or to fail to detect a predetermined number of synchronization sequences in the message format without immediately removing indication of detection. Each time window counter 216 reaches terminal count, line 232 asserts after a delay and triggers line 235 to reset sync loss counter 240, which itself counts clock pulses supplied at pin 233 from the master clock. As long as the correct LFSR sequence continues to arrive, the window counter will reach terminal count and provide an output at 232 before the error counter can reset it.

If the correct LFSR sequence stops arriving, error counter 214 begins to accumulate a sufficient number of counts to reach its terminal count before the window counter resets it, and the error counter will force both the window counter and itself to reset. This prevents the window counter from resetting the sync loss counter, which continues towards its own terminal count. If errors continue to occur in each window period for longer than the predetermined hysteresis interval, sync loss counter 240 reaches terminal count, asserts its output at 242, and resets latch 222 at pin 220. The Q* output 224 asserts, indicating loss of detection on 310 and removing the inhibit from gate 238. Gate 238 will be able to pass the parallel load pulse when the error counter next indicates an accumulation of errors.

Those skilled in the art will appreciate that the circuits shown in FIGS. 1 and 2 represent just one way to detect sequences and that other detectors may be substituted.

Figure 3A:
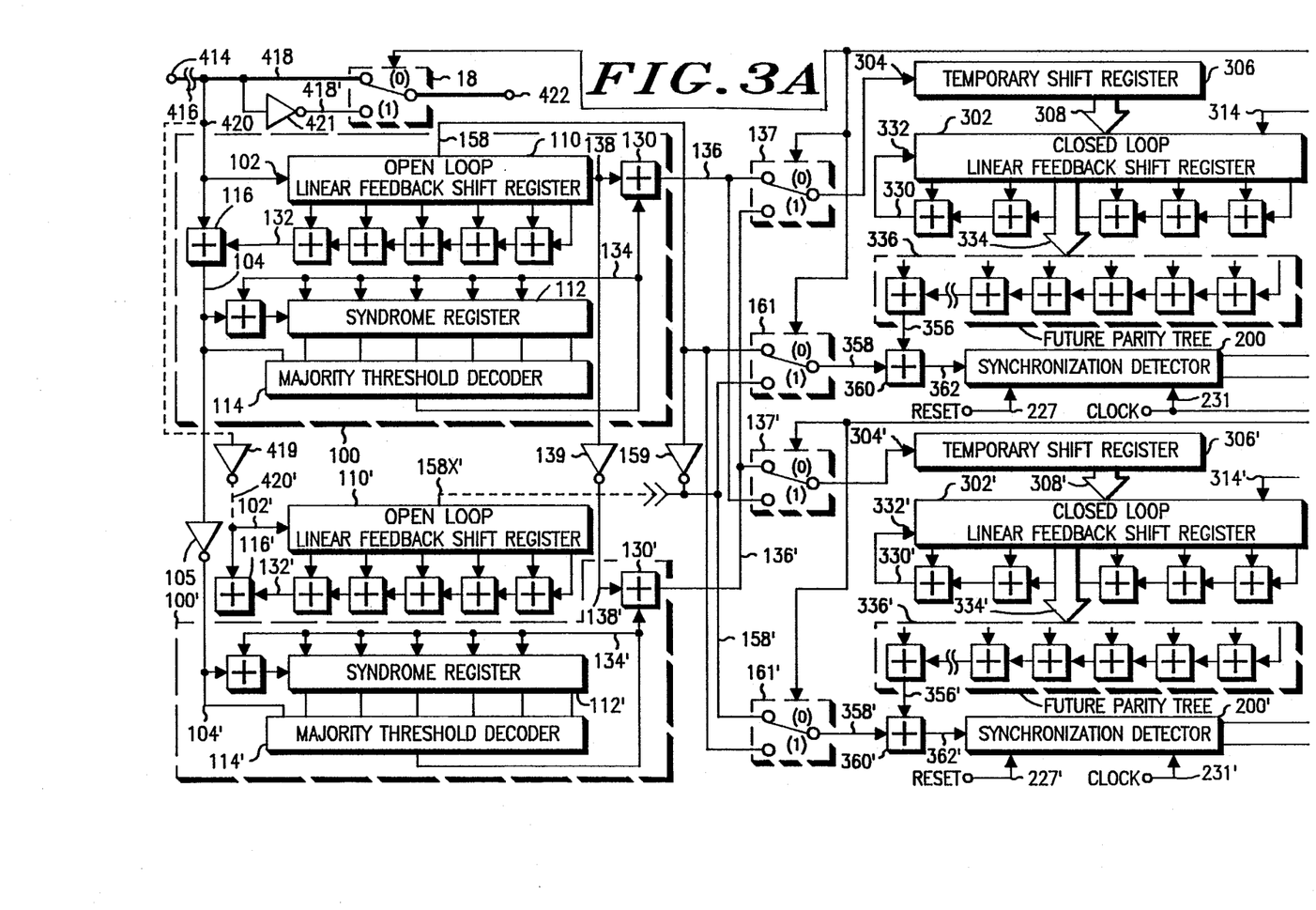
FIGS. 3a and 3b are a block diagrams of a polarity and synchronization sequence detector constructed in accordance with the present invention.
Figure 3B:
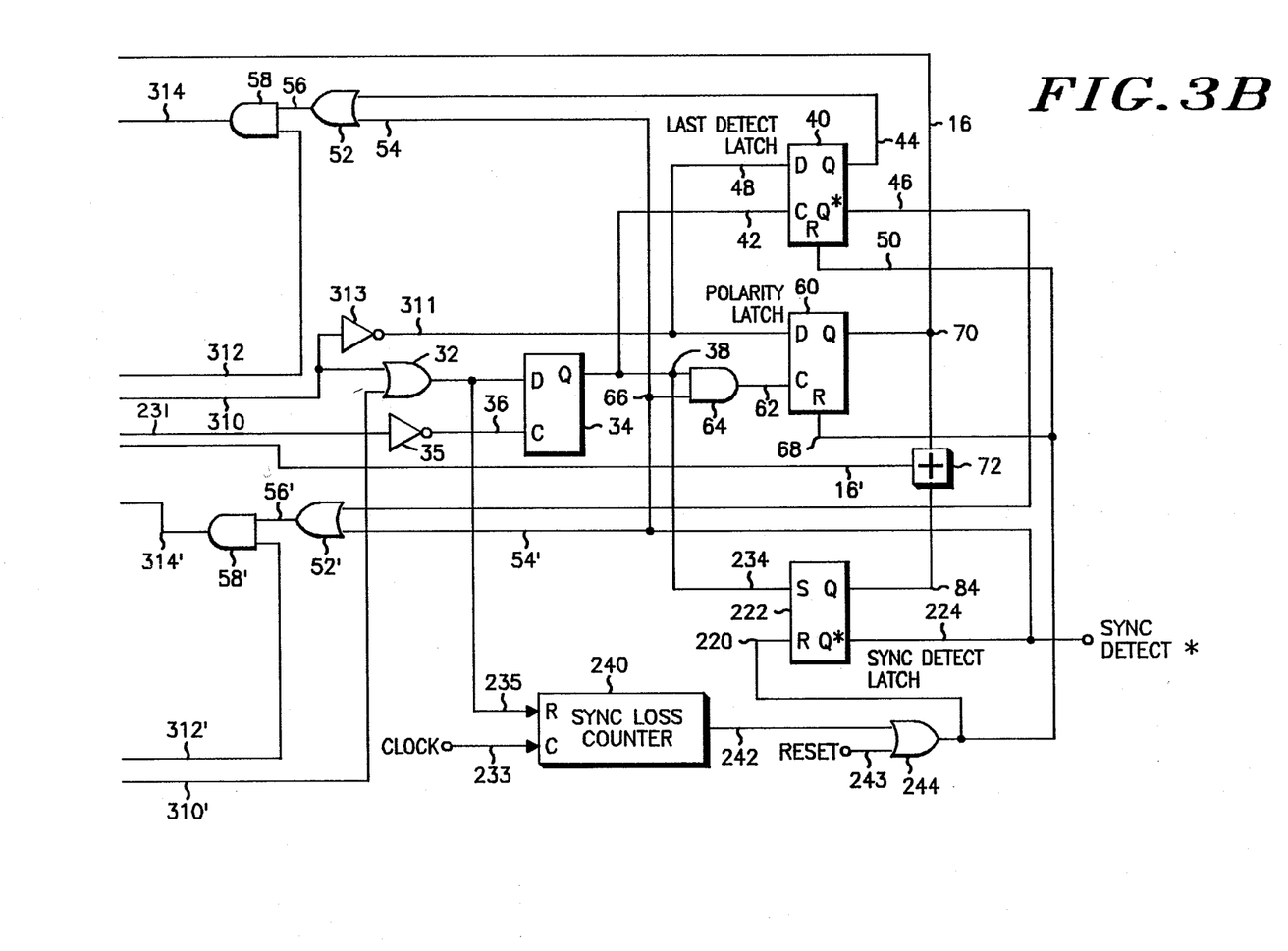

FIG. 3 now shows the preferred embodiment of the invention in its entirety. Two sequence detectors are provided and are indicated by similar reference numerals, with primed numerals indicating the detector that initially monitors inverted polarity received data. The data stream from the transmitter at 414 crosses channel 416 and reaches the receiver at 418. The non-inverted data stream couples to error correction circuit 100 on line 420. Circuit 100 is identical with that described in the discussion of FIG. 1 and includes open-loop register 110, the parity tree for generating parity bit 132, syndrome register 112, decoder 114, and exclusive-OR gate 130. Circuit 100 provides the delayed input sequence at 138, the shifted input sequence at 158, and the error-corrected output at 136.

As suggested by the dashed line, inverter 419 could be used to invert the input stream and provide inverted polarity, received data stream 420' to error-correction circuit 100' in like manner as line 420 couples non-inverted data to circuit 100. However, it will be recognized that the open-loop register 110 and the parity tree providing the sequence at 132 perform linear operations on the input data stream. Circuit 100' need not be duplicate these linear functions, since inversion performed before or after linear operations has the same effect. Thus, rather than obtaining the input signal to circuit 100' from inverted data stream 420', the output 104 of exclusive-OR gate 116 may be inverted at 105 to directly provide the inverted error estimate 104'. Furthermore, the delayed input sequence at 138 may be inverted at 139 to produce inverted, delayed input sequence 138'. The inverted, shifted input sequence, indicated as 158x', is unavailable, since the open-loop register 110' is not used in this embodiment. Instead, inverter 159 derives sequence 158' from sequence 158.

Avoiding duplication of the shift register and parity tree saves considerable circuitry, which may be advantageous in an implementation of the circuit. Those circuits performing non-linear functions, in particular, the majority threshold decoder and syndrome register, are not redundant and must be duplicated.

Switches 137, 161, 137', and 161' can direct the error-corrected and shifted sequences to either of the synchronization detection circuits. Initially, non-inverted signals couple to detector 200, and inverted signals couple to detector 200'. Once polarity detection occurs, the logic circuitry couples the sequences of the selected polarity to both detectors and ignores the sequences of the other polarity. Also, the logic circuitry selects which polarity of input signal, 418 or 418', will supply other circuits in the receiver at 422.

To initialize the logic and correlation circuits, an externally supplied signal provides momentary reset pulses. The pulses on lines 227 and 227' reset the counters in synchronization detectors 200 and 200', respectively; the pulse on line 243 drives OR gate 244 high to reset the sync detect latch 222, the polarity latch 60, and the last detect latch 40. Sync detect latch 222 provides a high at sync-detect* output 224, and it provides a low on Q output 84. Polarity latch 60 provides a low at its Q output 70, which couples on line 16 to switches 161 and 137 and places them in the state indicated by (0). These switches couple the non-inverted, shifted sequence 158 and error-corrected sequence 136 to sequence detection input lines 358 and 304, respectively. Polarity latch Q output 70 combines in exclusive-OR gate 72 with the Q output 84 of the sync detect latch and provides a logical low on line 16' to switches 161' and 137' to place them in the (0) state. These switches couple the inverted sequences 158' and 136' to detector input lines 358' and 304', respectively. Sync-detect* output 224 also enables AND gate 64 and passes on lines 54 and 54' through OR gates 52 and 52' to enable gates 58 and 58' and their parallel load lines 314 and 314', respectively.

Enabling the load lines allows both the sequence detectors to search for the transmitted LFSR sequence. If the net channel polarity is non-inverted and the LFSR sequence is being received, detector 200 responds. Line 310 goes high and drives OR gate 32 high. Delay element 34, clocked one half bit period later by the inverted clock 36 from inverter 35, produces a high at 38 that passes through enabled AND gate 64 to clock the polarity latch 60 at pin 62. The polarity latch captures the low at its D input from line 311 and produces a low on Q output 70. Line 70, connecting by line 16 to switch 18, causes it to select non-inverted data onto line 422, which can supply other receiver circuits (not shown here).

Once detection has occurred, the output of polarity latch 60 will not change unless sync is lost. The high signal 38 from the delay element 34 sets sync detect latch 222 at pin 234, pulling sync-detect* line 224 low, disabling AND gate 64 and preventing further clocking of the polarity latch. The Q output 84 of the sync detect latch goes high, which causes exclusive-OR gate 72 to invert the signal on line 70 and send a high on line 16' to switches 137' and 161'. These switches will select the (1) state and connect non-inverted polarity sequences to synchronization detector 200' and its associated circuitry. This means that detectors 200 and 200' now both search the non-inverted polarity data lines.

The inverted output at 311 from synchronization detector 200 also goes on line 48 to the D input of the last detect latch 40. On line 42, the Q output from delay element 34 clocks the last detect latch, which goes low on Q output 44 and high on Q* output 46. Line 54 will be low, because sync has been detected, so line 44 going low causes OR gate 52 to send a low on 56 and disable parallel load signals through AND gate 58. This prevents detector 200 from reloading if it stops receiving the LFSR sequence. Instead, it will continue to generate a local sequence from its initial load.

In contrast, Q* output 46 from last detect latch 40 couples through OR gate 52' and enables AND gate 58'. Therefore, detector 200' may reload its local shift register if it accumulates a sufficient error count and may quickly respond to changes in synchronization. For example, in a multiple site receiver system, if the channel delay shifts because receiver selection changes, detector 200 will continue to generate its sequence, which will now be incorrectly synchronized with received data. Detector 200' will lose synchronization and reload. Once detector 200' reloads, it will again be able to detect the synchronization sequence, which it will indicate by pulling line 310' high. This signal will force OR gate 32 high, and a high will again be clocked out of delay element 34 at Q output 38. Polarity latch 60 will not change, as AND gate 64 is disabled; however, last detect latch 40 will clock and sample its D input, which will at this time be at a logical high, as detector 200 has not pulled its detect line 310 high. Q output 44 will go high and couple through OR gate 52 to enable AND gate 58 and parallel loads to register 302. Q* output 46 will go low and, combining with the low on line 54', will force OR gate 52' low to disable AND gate 58' and cut off parallel loads to register 302'. The roles of the two sequence detectors will have reversed: detector 200' may not reload; detector 200 continues to search for shifts in synchronization and may reload if it accumulates errors. The process of exchanging roles may continue indefinitely or be terminated by an external event. For example, the message may include a timing mark in the message format to indicate the end of the synchronization interval, or the receiver may use a timer to terminate synchronization attempts after a predetermined time.

This discussion has assumed that non-inverted detector 200 was first to detect a sequence. If the channel had inverted the received data, detector 200' would have been the detector that first recognized a valid sequence. Line 310' would have gone high and pulled OR gate 32 high, and delay element 34 would have produced a high at 38 that would have clocked polarity latch 60 and last detect latch 40. The polarity latch would have sampled a high on line 311 and produced a high at Q output 70. This would have pulled line 16 high and set switches 137 and 161 to the (1) state, which would have coupled inverted sequences 136' and 158' to detector 200. Also, signal 70 would have combined with signal 84 and sent a low from exclusive-OR gate 72 on line 16' that would have kept switches 137' and 161' in the (0) state. These switches would have continued to provide the inverted sequences to detector 200'. Line 16 would also have caused switch 18 to select inverted polarity data stream 418' and provide it to receiver circuits at 422.

The embodiment shown in FIG. 3 differs slightly from the basic sequence detector shown in FIGS. 1 and 2 in the connection of the sync loss counter 240, which provides hysteresis in the detection process. Rather than being connected to the window counter output of a particular detector, the sync loss counter 240 connects to the output of OR gate 32. This signal combines the window counter outputs of the two synchronization detectors and goes high when either window counter reaches terminal count. As long as one of the two detectors continues to reach the end of the correlation interval before too many errors accumulate, the sync loss counter will be reset. If both detectors begin accumulating errors, neither will reach window terminal count and reset the sync loss counter. The sync loss counter will eventually reach its terminal count and reset the sync detect latch 222 on pin 220 through OR gate 244. Resetting the sync detect latch forces sync-detect* 224 high and starts the entire polarity and sequence detection process over from the beginning.

While a particular embodiment of the invention has been described, it should be understood that the invention is not limited to the embodiment shown, as many modifications may be made. It is contemplated to cover by the present application any and all such modifications that may fall within the true spirit and scope of the underlying principles disclosed and claimed herein.

What is claimed is:

1. A method for determining whether a received data stream has a non-inverted polarity or an inverted polarity and for generating a selected local sequence synchronized to a synchronization sequence included with the received data stream, where the received data stream has been received, after a channel delay, with either the non-inverted or the inverted polarity, and where the synchronization sequence has a predetermined polarity relative to the received data stream, the method comprising the steps of:

producing non-inverted and inverted input data streams from the received data stream;

examining both input data streams to obtain an initial synchronization with the synchronization sequence having the predetermined polarity;

selecting either the non-inverted or the inverted polarity input data stream according to the polarity of the synchronization sequence with which the initial synchronization was obtained, producing a selected polarity input data stream, and examining the selected polarity input data stream to obtain, if possible, at least a subsequent synchronization;

generating a first local sequence synchronized to the initial synchronization and, unless a subsequent local sequence becomes available, continuing to generate the first local sequence for at least the duration of a hysteresis period, regardless of whether the received data stream becomes interrupted or the channel delay changes after the initial synchronization was obtained;

generating a second local sequence that is synchronized to the subsequent synchronization, if the subsequent synchronization is obtained, and, unless another subsequent local sequence becomes available, continuing to generate the second local sequence for at least the duration of a hysteresis period, regardless of whether the received data stream becomes interrupted or the channel delay changes after the subsequent synchronization; and, alternately using either the first or the second local sequence for the selected local sequence as the initial and subsequent synchronizations are obtained.

2. The method of claim 1 in which, after expiration of a synchronization interval, the synchronization sequence is no longer included with the received data stream and in which the method includes the step of continuing to use either the first or the second local sequence for the selected local sequence according to which was being used immediately before expiration of the synchronization interval.

3. The method of claim 1 in which the synchronization sequence has been generated acccording to a known algorithm and may have become corrupted by errors and in which the step of examining the input data streams to obtain an initial synchronization includes the steps of:

producing from the non-inverted and inverted input data streams respective non-inverted and inverted error-corrected streams in which, if the synchronization sequence is present in the respective input data stream, at least some of the errors in the synchronization sequence will have been corrected;

generating non-inverted and inverted local sequences by applying the known algorithm to the non-inverted and inverted error-corrected streams, respectively;

generating non-inverted and inverted shifted local sequences by obtaining shifted versions of the non-inverted and inverted local sequences, respectively;

determining a degree of non-inverted signal correlation between the non-inverted input data stream and the non-inverted shifted local sequence, and determining a degree of inverted signal correlation between the inverted input data stream and the inverted shifted local sequence; and obtaining the initial synchronization according to whether the degree of non-inverted signal correlation or the degree of inverted signal correlation exceeds a detection threshold.

4. The method of claim 3 in which the known algorithm generates a linear feedback shift register sequence and in which the non-inverted and inverted shifted local sequences either are delayed by more than a predetermined delay or are advanced from the respective local sequences.

5. A circuit for determining whether a received data stream has a non-inverted polarity or an inverted polarity and for generating a selected local sequence synchronized to a synchronization sequence included with the received data stream, where the received data stream has been received, after a channel delay, with either the non-inverted or the inverted polarity, and where the synchronization sequence has a predetermined polarity relative to the received data stream, the circuit comprising:

means for producing non-inverted and inverted input data streams from the received data stream;

first and second synchronization detection means, initially coupled to the non-inverted and inverted input data streams, respectively, for examining both input data streams to obtain an initial synchronization with the synchronization sequence having the predetermined polarity;

polarity selection means, responsive to the first and second synchronization detection means, for selecting either the non-inverted or the inverted polarity input data stream according to the polarity of the synchronizaiton sequence with which the initial synchronization was obtained, for producing a selected polarity input data stream, and for subsequently coupling the selected polarity input data stream to both the first and second synchronization detection means for examining the selected polarity input data stream to obtain at least a subsequent synchronization;

first local sequence generation means, coupled to the first synchronization detection means, for generating a first local sequence synchronized to the initial synchronization and, unless a subsequent local sequence becomes available, for continuing to generate the first local sequence for at least the duration of a hysteresis period, regardless of whether the received data stream becomes interrupted or the channel delay changes after the initial synchronization was obtained;

second local sequence generation means, coupled to the second synchronization detection means, for generating a second local sequence synchronized to the subsequent synchronization, if the subsequent synchronization is obtained, and, unless another subsequent local sequence becomes available, for continuing to generate the second local sequence for at least the duration of a hysteresis period, regardless of whether the received data stream becomes interrupted or the channel delay changes after the subsequent synchronization; and, output selection means, coupled to the first and second local sequence generation means, for alternately using either the first or the second local sequence for the selected local sequence as the initial and subsequent synchronizations are obtained.

6. The circuit of claim 5 in which, after expiration of a synchronization interval, the synchronization sequence is no longer included with the received data stream and in which the circuit includes means for continuing to use either the first or the second local sequence for the selected local sequence according to which was being used immediately before expiration of the synchronization interval.

7. The circuit of claim 5 in which the synchronization sequence has been generated according to a known algorithm and may have become corrupted by errors and in which the synchronization detection means include:

first and second error-correction means, to which the non-inverted and inverted input data streams couple, respectively, for producing from the non-inverted and inverted input data streams respective non-inverted and inverted error-corrected streams in which, if the synchronization sequence is present in the respective input data streams, at least some of the errors in the synchronization sequence will have been corrected;

first and second local sequence generation means, coupled to the first and second error-correction means, respectively, for generating non-inverted and inverted local sequences by applying the known algorithm to the non-inverted and inverted error-corrected streams, respectively;

first and second shifted local sequence generation means, coupled to the first and second local sequence generation means, for generating non-inverted and inverted shifted local sequences by obtaining shifted versions of the non-inverted and inverted local sequences, respectively;

first signal correlation means, coupled to the non-inverted input data stream and to the first shifted local sequence generation means, for determining a degree of non-inverted signal correlation between the non-inverted input data stream and the non-inverted shifted local sequence;

second signal correlation means, coupled to the inverted input data stream and to the second shifted local sequence generation means, for determining a degree of inverted signal correlation between the inverted input data stream and the inverted shifted local sequence; and detection means, coupled to the first and second signal correlation means, for obtaining the initial synchronization according to whether the degree of non-inverted signal correlation or the degree of inverted signal correlation exceeds a detection threshold.

8. The circuit of claim 7 in which the known algorithm generates a linear feedback shift register sequence and in which the non-inverted and inverted shifted local sequences either are delayed by more than a predetermined delay or are advanced from the respective local sequences.

* * * * *